(12) United States Patent
Sakamoto et al.

(10) Patent No.: US 10,847,805 B2
(45) Date of Patent: Nov. 24, 2020

(54) CURRENT COLLECTOR CLAD WITH LITHIUM ION CONDUCTING SOLID ELECTROLYTE

(71) Applicant: The Regents of The University of Michigan, Ann Arbor, MI (US)

(72) Inventors: Jeffrey Sakamoto, Ann Arbor, MI (US); Travis Thompson, Ann Arbor, MI (US); Nathan Taylor, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 136 days.

(21) Appl. No.: 16/243,525

(22) Filed: Jan. 9, 2019

(65) Prior Publication Data

US 2019/0214650 A1    Jul. 11, 2019

Related U.S. Application Data

(60) Provisional application No. 62/615,118, filed on Jan. 9, 2018.

(51) Int. Cl.
*H01M 4/66* (2006.01)
*H01M 4/62* (2006.01)
(Continued)

(52) U.S. Cl.
CPC ........... *H01M 4/667* (2013.01); *H01M 4/382* (2013.01); *H01M 4/485* (2013.01); *H01M 4/582* (2013.01);
(Continued)

(58) Field of Classification Search
CPC ........... H01M 10/052; H01M 10/0525; H01M 10/0562; H01M 10/0585;
(Continued)

(56) References Cited

U.S. PATENT DOCUMENTS

| 4,637,966 A | 1/1987 | Uba et al. |
| 5,595,839 A | 1/1997 | Hossain |

(Continued)

FOREIGN PATENT DOCUMENTS

| WO | 2001073873 A1 | 10/2001 |
| WO | 2003073531 A2 | 9/2003 |
| WO | 2016153992 A1 | 9/2016 |

OTHER PUBLICATIONS

Bullock, Progress and Challenges in Bipolar Lead-Acid Battery Development, J. Electrochem Soc., 1995, 142(5):1726-1731.
(Continued)

*Primary Examiner* — Carlos Barcena
(74) *Attorney, Agent, or Firm* — Quarles & Brady LLP

(57) ABSTRACT

An article for forming an electrochemical device is disclosed. The article comprises a metallic current collector clad with an ion conducting solid-electrolyte material such that intimate contact between the current collector and the ion conducting solid-electrolyte material is made. A lithium metal anode can be formed in situ between the current collector clad and the ion conducting solid-electrolyte material from lithium ions contained within a cathode material that is placed in contact with the ion conducting solid-electrolyte material. A bipolar electrochemical cell can be constructed from the article.

34 Claims, 5 Drawing Sheets

(51) Int. Cl.
*H01M 10/0585* (2010.01)
*H01M 10/0525* (2010.01)
*H01M 10/0562* (2010.01)
*H01M 4/38* (2006.01)
*H01M 4/58* (2010.01)
*H01M 10/052* (2010.01)
*H01M 4/485* (2010.01)
*H01M 4/02* (2006.01)

(52) U.S. Cl.
CPC ....... *H01M 4/5815* (2013.01); *H01M 4/5825* (2013.01); *H01M 4/62* (2013.01); *H01M 4/661* (2013.01); *H01M 4/662* (2013.01); *H01M 10/052* (2013.01); *H01M 10/0525* (2013.01); *H01M 10/0562* (2013.01); *H01M 10/0585* (2013.01); *H01M 2004/028* (2013.01); *H01M 2300/0071* (2013.01); *H01M 2300/0077* (2013.01)

(58) Field of Classification Search
CPC ... H01M 2004/028; H01M 2300/0071; H01M 2300/0077; H01M 4/382; H01M 4/485; H01M 4/5815; H01M 4/582; H01M 4/5825; H01M 4/62; H01M 4/661; H01M 4/662; H01M 4/667
See application file for complete search history.

(56) References Cited

U.S. PATENT DOCUMENTS

| | | | |
|---|---|---|---|
| 6,168,884 B1 | 1/2001 | Neudecker et al. | |
| 7,959,769 B2 * | 6/2011 | Zhang | C23C 14/08 204/192.12 |
| 9,318,748 B2 | 4/2016 | Chami | |
| 9,577,231 B2 | 2/2017 | Fuhr et al. | |
| 2001/0041294 A1 | 11/2001 | Chu et al. | |
| 2004/0161667 A1 | 8/2004 | Fukuzawa et al. | |
| 2009/0023061 A1 | 1/2009 | Ogg et al. | |
| 2012/0225347 A1 | 9/2012 | Kojima | |
| 2016/0158556 A1 | 6/2016 | Viavattine | |
| 2016/0211498 A1 | 7/2016 | Kim et al. | |
| 2018/0131038 A1 * | 5/2018 | Miki | H01M 4/38 |
| 2018/0131039 A1 * | 5/2018 | Miki | H01M 4/1397 |

OTHER PUBLICATIONS

Iriyama, Chapter 4, A Novel All-Solid-State Thin-Film-Type Lithium-Ion Battery with In-Situ Prepared Electrode Active Materials, pp. 75-92, from the book "Lithium-Ion Batteries", 2010, www.intechopen.com/books/lithium-ion-batteries.

Thompson et al., Tetragonal vs. Cubic Phase Stability in Al-free Ta doped Li 7 La 3 Zr 2 O 12 (LLZO), Journal of Materials Chemistry A, 2014, 2(3):13431-13436.

Thompson et al., A Tale of Two Sites: On Defining the Carrier Concentration in Garnet-Based Ionic Conductors for Advanced Li Batteries, Advanced Energy Materials, 2015, 5(11):1500096, 9 pages.

PCT International Search Report and Written Opinion, PCT/US2019/012871, Mar. 22, 2019, 10 pages.

* cited by examiner

CURRENT COLLECTOR CLAD WITH LITHIUM ION CONDUCTING SOLID ELECTROLYTE

CROSS-REFERENCES TO RELATED APPLICATIONS

This application claims priority to U.S. Patent Application No. 62/615,118 filed Jan. 9, 2018.

STATEMENT REGARDING FEDERALLY SPONSORED RESEARCH

This invention was made with government support under DE-AR0000653 awarded by the Department of Energy. The government has certain rights in the invention.

BACKGROUND OF THE INVENTION

1. Field of the Invention

The invention relates to an article comprising a metallic current collector clad with an ion conducting solid-electrolyte material such that intimate contact between the current collector and the ion conducting solid-electrolyte material is made and a lithium metal anode can be formed in situ from lithium ions contained within a cathode material. The invention also relates to a bipolar electrochemical cell constructed from the article using methods of the invention.

2. Description of the Related Art

Lithium ion (Li-ion) battery technology has advanced significantly over the last decade and has a market size projected to be $10.5 billion by 2019. Current state of the art lithium ion batteries comprise two electrodes (an anode and a cathode), a separator material that keeps the electrodes from touching but allows $Li^+$ ions through, and an electrolyte (which is an organic liquid with lithium salts). During charge and discharge, $Li^+$ ions are exchanged between the electrodes.

Batteries with longer lives, higher capacities, and reduced safety concerns are needed for many applications including electric vehicles, grid storage, and consumer electronics. For many years, lithium (Li) metal has been considered the "ideal" anode material because of its ability to store lightweight lithium in the metallic form without the need for an inactive host material or a conductive scaffold. Lithium can provide a capacity of 3860 mAh/g and the lowest theoretical anode potential, making it an enabling technology for next-generation battery systems including Li-sulfur and Li-air. Unfortunately, reactivity issues resulting from electrode-electrolyte interactions prevent extended cycling of lithium metal batteries. These interactions lead to the formation of erratic dendritic structures that cause a reduction in Coulombic efficiency and eventual failure. These types of failure not only may shorten battery life but may also cause safety hazards as a result of gas evolution and possible ignition of the flammable electrolyte. One solution to this problem that is often researched is to develop a solid-state electrolyte battery technology that mechanically prevents dendritic growth from the anode.

Currently, the liquid electrolyte used in state-of-the-art (SOA) Li-ion batteries is not compatible with advanced battery concepts, such as the use of a lithium metal anode or high voltage cathodes. Furthermore, the liquid utilized in SOA Li-ion batteries is flammable and susceptible to combustion upon thermal runaway. The use of a solid electrolyte to replace the liquid used in the SOA enables advanced cell chemistries while simultaneously eliminating the risk of combustion. Several solid-electrolytes have been identified and heavily researched over the past decade. These new solid-state batteries offer the promise of 3-4 times the energy density compared to the SOA Li-ion batteries at a reduction in the pack cost of 20%.

Another approach for achieving higher performance battery technology is to utilize bipolar cell configurations, which would also increase the energy density and reduce the pack cost. Bipolar cell configurations allow individual cells to be stacked in a layered configuration. In this construction, each cell in the battery shares current collectors with one of its adjacent, neighboring cells. At each end of the layered configuration is a single current collector that acts as the final anode and cathode. This "sandwich-like" packing of cell layers allows for a shorter current path and a larger surface area when compared to connections in traditional monopolar batteries. The net result of the bipolar design is a reduction in power loss, manufacturing costs, and weight of the battery. Unfortunately, commercialization of bipolar battery technology has been largely hindered by slow development of manufacturing processes and the inability to seal each cell from electrolyte leakage.

Therefore, what is needed are improved battery constructions and manufacturing methods that cure the deficiencies of the battery configurations discussed above.

SUMMARY OF THE INVENTION

This disclosure provides an article for forming an electrochemical device such as a bipolar battery and a method of making an electrochemical device. The article may comprise a plurality of layered structures formed from multiple stacked cathode active materials and current collectors clad with a solid-state electrolyte. When a formation current is passed through the article, an anode layer can form between each current collector and solid-state electrolyte, thereby allowing the newly formed electrochemical device to function as a bipolar battery.

This configuration and in situ generation of the anode layer provides numerous advantages over previous bipolar battery configurations. For example, because the initial stack within the article requires only two components, namely the cathode active material and the clad current collector, the manufacturing processes are considerably simplified. Additionally, the use of a solid-state electrolyte reduces the possibility of electrolyte leakage and aids in preventing dendritic growth from the anode layer once formed. Also, the in situ formation of the anode layer can occur safely at any time after creation of the article; this allows the articles to be safely transported unformed. Even further, the current collector clad with the solid-state electrolyte is compatible with a wide variety of cathode active materials.

In one aspect, the present disclosure provides an article for forming an electrochemical device. The article comprises a plurality of layered structures, each layered structure comprising (i) a current collector clad with a solid-state electrolyte material, and (ii) a cathode active material in contact with the solid-state electrolyte material. The current collector of one of the layered structures can be in contact with cathode active material of another of the layered structures. Each layered structure of the article may be unformed. The current collector may comprise a single material comprising a metal or metal alloy.

The current collector can comprise a material selected from the group consisting of nickel, molybdenum, titanium, zirconium, tantalum, alloy steel, stainless steel, nickel based super alloys, cobalt based super alloys, copper, aluminum, or mixtures thereof. The current collector can comprise a bimetal having a first material that at least partially contacts the solid-state electrolyte material and a second material that at least partially contacts the cathode active material of another of the layered structures. The first material may be selected from the group consisting of nickel, molybdenum, titanium, zirconium, tantalum, alloy steel, stainless steel, nickel based super alloys, cobalt based super alloys, copper, or mixtures thereof. The second material may be selected from the group consisting of aluminum, nickel, alloy steel, stainless steel, nickel based super alloys, or mixtures thereof. The current collector can have a thickness between 1 nanometer and 100 micrometers.

The solid-state electrolyte material can comprise a material selected from the group consisting of lithium phosphorous oxynitride (LiPON), oxide based garnets, sodium super ionic conductors (NaSICON), lithium super ionic conductors (LiSICON), thio-LiSICONs, sulfide glass, polymers, or mixtures thereof. The solid-state electrolyte material may be selected from the group consisting of lithium lanthanum zirconium oxide (LLZO-$Li_7La_3Zr_2O_{12}$), aluminum doped LLZO (e.g., $Li_{6.25}La_{2.7}Zr_2Al_{0.25}O_{12}$), tantalum doped LLZO, lithium aluminum titanium phosphate (LATP), lithium aluminum germanium phosphate (LAGP), lithium phosphorous sulfide (LPS), poly(ethylene oxide) (PEO), polyacrylonitrile (PAN), crystalline thermoplastic polymers, or mixtures thereof. The solid-state electrolyte material can comprise lithium lanthanum zirconium oxide (LLZO) or a derivative thereof. The solid-state electrolyte material may be clad onto the current collector using at least one of chemical vapor deposition, physical vapor deposition, atomic layer deposition, slurry casting and sintering, painting, powder coating, thermal spraying, cold spraying, aerosol deposition, flux deposition, electrodeposition, electroless chemical deposition, or combinations thereof. The solid-state electrolyte material can have a thickness between 1 nanometer and 100 micrometers.

The cathode active material can comprise an active material selected from the group consisting of layered oxides, olivine phosphates, spinel oxides, disordered rock salt oxides, conversion cathodes, sulfur, lithium titanium sulfide, vanadium oxide, or mixtures thereof. The active material can comprise at least one of lithium cobalt oxide (LCO), lithium nickel manganese cobalt oxide, lithium nickel oxide (LNO), lithium nickel cobalt aluminum oxide (NCA), lithium iron phosphate (LFP), lithium nickel phosphate (LNP), lithium cobalt phosphate (LCP), lithium manganese phosphate (LMP), lithium manganese oxide (LMO), lithium nickel manganese oxide (LMNO), lithium nickel zirconium oxide, lithium zirconium oxide, lithium magnesium zirconium oxide, lithium nickel tantalum oxide, lithium niobium oxide, lithium iron sulfide, lithium copper fluoride, lithium iron fluoride, or mixtures thereof. The cathode active material can form a composite cathode layer along with an ion conducting material. The ion conducting material can comprise at least one of an oxide solid electrolyte, a phosphate solid electrolyte, a sulfur based solid electrolyte, a polymer based solid electrolyte, or a gel based electrolyte. The cathode active material can have a thickness between 1 nanometer and 400 micrometers. The cathode active material and the current collector can have the same planar shape and may be directly superimposed over one another in each layered structure.

In another aspect, the present disclosure provides a method of making an electrochemical device, the method comprising the steps of: (a) providing a layer of a cathode active material; (b) providing a current collector clad with a solid-state electrolyte material; (c) placing the layer of the cathode active material in contact with the solid-state electrolyte material to create a first layered structure; (d) repeating steps (a)-(c) to create a second layered structure; and (e) combining the first layered structure and the second layered structure such that a current collector of the first layered structure is in contact with cathode active material of the second layered structure. Step (d) may be repeated several times to create a plurality of layered structures to be combined using the procedure of step (e).

In the method, the current collector can comprise a material selected from the group consisting of nickel, molybdenum, titanium, zirconium, tantalum, alloy steel, stainless steel, nickel based super alloys, cobalt based super alloys, copper, aluminum, or mixtures thereof. In the method, the current collector can be a bimetal having a first material that at least partially contacts the solid-state electrolyte material and a second material that at least partially contacts the cathode active material of the adjacent layered structure. The first material may be selected from the group consisting of nickel, molybdenum, titanium, zirconium, tantalum, alloy steel, stainless steel, nickel based super alloys, cobalt based super alloys, copper, or mixtures thereof. The second material may be selected from the group consisting of aluminum, nickel, alloy steel, stainless steel, nickel based super alloys, or mixtures thereof. In the method, the current collector can have a thickness between 1 nanometer and 100 micrometers.

In the method, the solid-state electrolyte material can comprise a material selected from the group consisting of lithium phosphorous oxynitride (LiPON), Oxide based garnets, sodium super ionic conductors (NaSICON), lithium super ionic conductors (LiSICON), thio-LiSICONs, sulfide glass, polymers, or mixtures thereof. The solid-state electrolyte material may be comprised of a material selected from the group consisting of lithium lanthanum zirconium oxide (LLZO), aluminum doped LLZO, tantalum doped LLZO, lithium aluminum titanium phosphate (LATP), lithium aluminum germanium phosphate (LAGP), lithium phosphorous sulfide (LPS), poly(ethylene oxide) (PEO), polyacrylonitrile (PAN), crystalline thermoplastic polymers, or mixtures thereof. The solid-state electrolyte material can comprise lithium lanthanum zirconium oxide (LLZO) or a derivative thereof.

In the method, the solid-state electrolyte material may be clad onto the current collector using at least one of chemical vapor deposition, physical vapor deposition, atomic layer deposition, slurry casting and sintering, painting, powder coating, thermal spraying, cold spraying, aerosol deposition, flux deposition, electrodeposition, or electroless chemical deposition. The solid-state electrolyte material can have a thickness between 1 nanometer and 100 micrometers.

In the method, the layer of a cathode active material can comprise an active material selected from the group consisting of layered oxides, olivine phosphates, spinel oxides, disordered rock salt oxides, conversion cathodes, sulfur, lithium titanium sulfide, vanadium oxide, or mixtures thereof. In the method, the active material can comprise at least one of lithium cobalt oxide (LCO), lithium nickel manganese cobalt oxide, lithium nickel oxide (LNO), lithium nickel cobalt aluminum oxide (NCA), lithium iron phosphate (LFP), lithium nickel phosphate (LNP), lithium cobalt phosphate (LCP), lithium manganese phosphate (LMP), lithium manganese oxide (LMO), lithium nickel manganese oxide (LMNO), lithium nickel zirconium oxide, lithium zirconium oxide, lithium magnesium zirconium oxide, lithium nickel tantalum oxide, lithium niobium oxide, lithium iron sulfide, lithium copper fluoride, lithium iron fluoride, or mixtures thereof. The layer of the cathode active material can have a thickness between 1 nanometer and 400 micrometers.

In the method, the step of positioning the layer of a cathode active material can comprise placing the layer of a cathode active material on the solid-state electrolyte material in a manner such that the layer of a cathode active material and the current collector are congruently superimposed over one another.

The method may further comprise enclosing the layered structures in a housing, the housing configured to enclose and secure the layered structures. The method may further comprise passing a formation current through the layered structures, wherein passing the formation current generates an anode layer between each solid-state electrolyte material layer and its adjacent current collector.

In the method, the anode layer can comprise lithium metal. In the method, the anode layer can consist essentially of lithium metal. The anode layer can have a thickness between 1 nanometer and 100 micrometers. In the method, the anode layer may form evenly along the surface of the current collector. In the method, the formation current may be between 0.001 and 150 Amperes. In the method, the formation current may be applied for 0.01 to 48 hours.

One performance advantage of a lithium metal battery is realized by the use of a lithium metal anode. Several configurations for the lithium metal battery are possible but all hinge on the ability to charge and discharge the lithium metal battery repeatably without dendrite penetration from the lithium metal anode. This disclosure provides an article which comprises any suitable metal foil current collector clad in any suitable manner with any suitable ion conducting solid-electrolyte material such that intimate contact between the current collector and the ion conducting solid-electrolyte material is formed and a lithium metal anode is formed in situ from lithium ions contained within any suitable composite cathode. The formed electrochemical cells are preferable arranged in a bi-polar configuration.

These and other features, aspects, and advantages of the present disclosure will become better understood upon consideration of the following detailed description, drawings, and appended claims.

DETAILED DESCRIPTION OF THE INVENTION

Figure 1A:
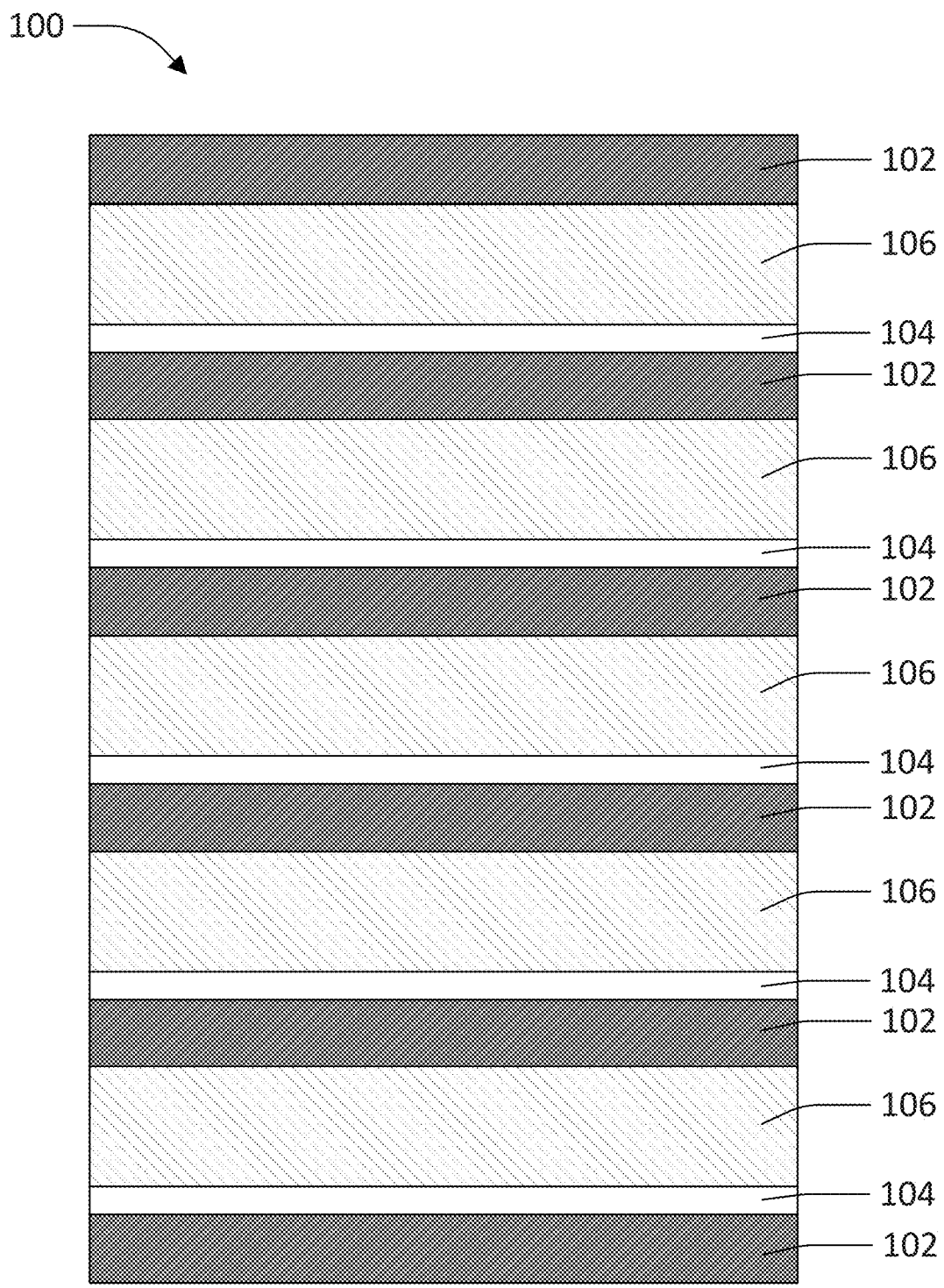
FIG. 1A is an exemplary illustration of a side view of an article for forming an electrochemical device according to one embodiment of the present disclosure. In this illustration, no formation current has yet been passed through the article.

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

As used herein, a "cell" or "electrochemical cell" is a basic electrochemical unit that contains the electrodes and an electrolyte. A "battery" or "battery pack" is one or more cells or cell assemblies which are ready for use, as it often contains an appropriate housing, electrical interconnections, and possibly electronics to control and protect the cells from failure. A "bipolar" configuration contains cells stacked in series so that the negative current collector of one cell acts as the positive current collector of its adjacent cell.

As used herein, "electrochemical cells" are contemplated as being rechargeable cells, also referred to as secondary cells, unless the context clearly dictates otherwise. The "anode" is defined as the electrode that undergoes oxidation, therefore losing electrons, during discharge. The "cathode" is defined as the electrode that undergoes reduction, therefore gaining electrons, during discharge. These electrochemical roles are reversed during the charging process, but the "anode" and "cathode" electrode designations remain the same.

As used herein, "formation" is the process of charging the battery for the first time. This charging may be accomplished using a "formation current". In the present invention, formation can create an anode between the current collector and the solid-state electrolyte material using metal ions originally present in the cathode. An "unformed" structure has not yet undergone formation.

As discussed above, in one aspect, the present disclosure provides an article for forming an electrochemical device, the article comprising a plurality of layered structures, each layered structure comprising (i) a current collector clad with a solid-state electrolyte material, and (ii) a cathode active material in contact with the solid-state electrolyte material. The current collector of one of the layered structures can be in contact with cathode active material of another of the layered structures.

In another aspect, the present disclosure provides a method of making an electrochemical device, the method comprising the steps of providing a layer of a cathode active material; providing a current collector clad with a solid-state electrolyte material; placing the layer of the cathode active material in contact with the solid-state electrolyte material to create a first layered structure; repeating the three previous steps to create a second layered structure; and combining the first layered structure and the second layered structure such that a current collector of the first layered structure is in contact with cathode active material of the second layered structure. In the method of making an electrochemical device of the present disclosure, the first three steps presented above may be repeated several times to create a plurality of layered structures. The plurality of layered structures may then be combined as described in the last step.

The above article may act as a precursor for a part or for all of the electrochemical device. In the article, each layered structure may be unformed. The metal anode may be formed in situ within the article upon exposure to a formation current. The metal ions for this formation process may be originally contained within the cathode. Once the article has undergone formation, it can contain an anode layer and may then be considered an electrochemical device with multiple bipolar electrochemical cells.

The unique construction of the article for forming the electrochemical device provides several key advantages over existing battery configurations:

(I) The article is flexible in terms of the cathode active material used and is amenable to conventional Li-ion cathodes. This allows the systems and methods of the present disclosure to be easily integrated with different cathode approaches that are often tied to individual manufacturers. Furthermore, the article is amenable to solid-state cathode approaches and future advanced battery concepts including conversion cathodes, sulfur cathodes, and air cathodes. Therefore, the article can enable beyond Li-ion concepts in an incremental manner, significantly reducing a barrier for adoption.

(II) The article may not originally contain an anode layer but rather form one in situ upon the use of a formation current. This may result in significant weight and volume savings reductions. However, further advantages include the ability to ship the articles in fully discharged states with no risk of reaction or fire. Upon arrival, the cells may then be formed. Such a transportation process is not feasible with current Li-ion batteries since flammable and toxic gases may be generated during formation and must be removed as one of the last steps of manufacturing. Thus post transportation formation would allow for risk-free and cheap transportation of the articles.

(III) The article is constructed from two repeating parts: the cathode active layer and the clad current collector. Therefore, unlike traditional battery configurations, only two components need to be brought together instead of three as is required now for Li-ion assembly. This reduces the time, complexity and capital expenditures required for manufacturing.

(IV) The bipolar configuration allows for the sharing of current collectors to reduce mass and volume within the cell, resulting in increased energy density and specific energy. The clad component may be received by an individual manufacturer with half of the cell already fabricated, resulting in only a single application process for the cathode of choice being necessary.

The article and electrochemical device may comprise additional components besides the cathode active layer and the current collector clad with a solid-state electrolyte. For example, the article may contain a housing configured to enclose and secure the layered structures, terminal current collectors, additional wiring, insulation, safety mechanisms, or other common electrochemical device components. The method of making the electrochemical device may comprise enclosing the plurality of layered structures within the housing or adding any of the other additional components listed above. The cathode active material may be present within a composite cathode layer. There may be a compressive layer designed to account for volumetric stresses caused by any anode layer formed in situ.

Current Collector

A cell of the present disclosure can be constructed such that the anode and cathode share a common current collector and the cell is considered bipolar. The current collector present in the article and method of the current disclosure may be a single material comprising a metal or a metal alloy. If a single material, the current collector can comprise a material selected from the group consisting of nickel, molybdenum, titanium, zirconium, tantalum, alloy steel, stainless steel, nickel based super alloys (e.g., Inconel), cobalt based super alloys, copper, aluminum, or mixtures thereof. Alternatively, the current collector may be a bimetal having a first material that at least partially contacts the solid-state electrolyte material and a second material that at least partially contacts the cathode active material of another of the layered structures. If a bimetal, the first material may be selected from the group consisting of nickel, molybdenum, titanium, zirconium, tantalum, alloy steel, stainless steel, nickel based super alloys, cobalt based super alloys, copper, or mixtures thereof. If a bimetal, the second material may be selected from the group consisting of aluminum, nickel, alloy steel, stainless steel, nickel based super alloys, or mixtures thereof. The current collector may have a thickness between 1 nanometer and 100 micrometers, between 10 nanometers and 60 micrometers, or between 900 nanometers and 25 micrometers.

Solid-State Electrolyte

The solid-state electrolyte material present in the article and method of the current disclosure may be any suitable solid electrolyte capable of conducting metal ions. For example, the solid-state electrolyte may be lithium phosphorous oxynitride (LiPON). The solid-state electrolyte may be an oxide based garnet such as lithium lanthanum zirconium oxide (LLZO), aluminum doped LLZO, niobium doped LLZO, or tantalum doped LLZO. The solid-state electrolyte may be a sodium super ionic conductor (NaSICON) such as lithium aluminum titanium phosphate (LATP). The solid-state electrolyte may be lithium super ionic conductor (LiSICON). The solid-state electrolyte may be a thio-LISICON. The solid-state electrolyte may be lithium aluminum germanium phosphate (LAGP). The solid-state electrolyte may be sulfide glass such as lithium phosphorous sulfide (LPS). The solid-state electrolyte may be a polymer such as polyethylene oxide (PEO), polyacrylonitrile (PAN), or a crystalline thermoplastic polymer. The solid-state electrolyte may comprise a mixture of any of the electrolytes listed above. The solid-state electrolyte may have a thickness between 1 nanometer and 100 micrometers, between 100 nanometers and 50 micrometers, or between 1 micrometer and 25 micrometers.

The solid-state electrolyte material present in the article and method of the current disclosure may be clad onto the current collector using any suitable method of attachment. For example, cladding the solid-state electrolyte onto the current collector may be accomplished using chemical vapor deposition, physical vapor deposition, atomic layer deposition, slurry casting and sintering, painting, powder coating, thermal spraying, cold spraying, aerosol deposition, flux deposition, electrodeposition, electroless chemical deposition, or combinations thereof.

The cathode active material and the current collector may have the same planar shape and may be directly superimposed over one another in each layered structure. The cathode active material and the current collector may have rectangular or circular planar shape. The plurality of layered structures formed may be cylindrically wound.

Cathode Active Materials

A major advantage of the present disclosure is the wide range of cathode active materials that can be used. The cathode active material can contain the metal ions that may be used to form the metal anode between the ion conducting solid-electrolyte material and the current collector. Although lithium ion containing cathodes are primarily presented here, one of skill in the art would appreciate that another metal containing cathode active material could be readily substituted. For example, sodium or magnesium containing cathode active materials may be used.

The cathode active material may comprise layered oxides such as lithium cobalt oxide (LCO), lithium nickel manganese cobalt oxide (NMC such as NMC 111, 622, or 811), lithium nickel oxide (LNO), or lithium nickel cobalt aluminum oxide (NCA). The cathode active material may comprise olivine phosphates such as lithium iron phosphate (LFP), lithium nickel phosphate (LNP), lithium cobalt phosphate (LCP), or lithium manganese phosphate (LMP). The cathode active material may comprise a spinel oxide such as lithium manganese oxide (LMO) or lithium nickel manganese oxide (LMNO). The cathode active material may comprise disordered rock salt oxides such as lithium nickel zirconium oxide, lithium zirconium oxide, lithium magnesium zirconium oxide, lithium nickel tantalum oxide, or lithium niobium oxide. The cathode active material may comprise conversion cathodes such as lithium iron sulfide, lithium copper fluoride or lithium iron fluoride, or mixtures thereof. The cathode active material may comprise sulfur, lithium titanium sulfide, or vanadium oxide. The cathode active material may comprise a mixture of any of these materials. The cathode active material may have a thickness between 1 nanometer and 400 micrometers, between 10 micrometers and 200 micrometers, or between 50 micrometers and 150 micrometers.

In addition to the materials listed above, the cathode active material may be present within a composite cathode layer that contains an additional secondary material. The secondary material may conduct metal ions. The composite cathode may operate at high temperatures and require a phase to melt to become ionically conducting. In this case, the phase that melts may comprise a secondary material such as lithium aluminum chloride, lithium hydroxide, or a polymer. The phase that melts may comprise a combination of lithium containing salts such as hydroxides, nitrates or chlorides. The phase that melts may comprise a combination of alkali metal containing salts such as hydroxides, nitrates or chlorides. The secondary material may comprise oxide and/or phosphate solid electrolyte phases such as oxide based garnets like LLZO, aluminum doped LLZO, niobium doped LLZO, and tantalum doped LLZO or sodium super ionic conductors (NaSICON) like LATP. The secondary material may be a sulfur based solid-state electrolyte such as sulfuric lithium super ionic conductors like LAGP or a sulfide glass like lithium phosphorous sulfide (LPS). The secondary material may be a polymer based solid electrolyte such as PEO, PAN, polyphenylene oxide (PPO), poly[bis (methoxy-ethoxy-ethoxy)phosphazene (MEPP), crystalline thermoplastics, or a block co-polymer like PEO-PMMA, PEO-PS, PEO-PSi, PEO-PPO, PEO-PPG, or some combination therein. If polymer based, the secondary material may comprise plasticizers or it may comprise lithium salts like LiTFSI, LiBOB, $LiPF_6$, LiI, LiBr, LiCl, LiF, $Li_2SO_4$, LiTFSA, $LiCF_3SO_3$, $LiN(CF_3SO_2)_2$. The secondary material may be a gel based electrolyte with a solid network entrapping a liquid electrolyte. The solid gel network may be PVDF-HFP, PMMA, PAN, poly-(D)-glucosamine, polysaccharides, PEG-DMA, PVP, or a similar material. The liquid electrolyte may comprise a lithium salt such as LiTFSI, LiBOB, $LiPF_6$, LiI, $LiBF_4$, LiBr, LiCl, LiF, $Li_2SO_4$, LiTFSA, or $LiCF_3SO_3$. The liquid electrolyte may comprise a solvent or blend of solvents such as any mixture of linear carbonates, fluorinated linear carboxylates, fluorinated ethers, γ-butyrolactone, fluorinated γ-butyrolactone, tetraethylene glycol dimethyl ether, triethylene glycol dimethyl ether, bis(2-methoxyethyl) ether, ethyl methyl sulfone, and allyl methyl sulfone.

Alternatively, the composite cathode may be a traditional Li-ion cathode comprised of a blend of cathode active materials, conductive additives, and polymeric binder with porosity that is filled with a liquid electrolyte. In such a case, the conductive additive may be any material which is electronically conducting including carbon black, carbon fibers, carbon nanotubes, graphene, metal powders, or ceramic conducting phases. The binder may be any polymer such as PVDF, PTFE, SBR, CMC, PMMA, or PAN. The liquid electrolyte may be a solvent or blend of solvents with a lithium salt and other additives. For example, a lithium salt additive may comprise LiTFSI, LiBOB, $LiPF_6$, LiI, $LiBF_4$, LiBr, LiCl, LiF, $Li_2SO_4$, LiTFSA, or $LiCF_3SO_3$. The liquid electrolyte may comprise low vapor pressures solvents such as PC, DMSO, DMF, DMAc, fluorinated ethers, fluorinated linear carboxylates, γ-butyrolactone, fluorinated γ-butyrolactone, tetraethylene glycol dimethyl ether, triethylene glycol dimethyl ether, bis(2-methoxyethyl) ether, ethyl methyl sulfone, allyl methyl sulfone or a high oxidative stability solvent, or a mixture thereof.

Formation Current

The present disclosure provides a method of making an electrochemical device. In one embodiment, this method may further comprise passing a formation current through the layered structures, wherein passing the formation current can generate an anode layer between each solid-state electrolyte material layer and its adjacent current collector. The anode layers may form evenly along the surfaces of the current collectors. The anode layers may comprise lithium metal. The anode layers may consist essentially of lithium metal. The formation current may produce between 1 and 300, between 5 and 60, between 10 and 30, or between 2 and 12 anode layers and corresponding electrochemical cells within the electrochemical device. The anode layer may have a thickness between 1 nanometer and 100 micrometers, between 10 nanometers and 50 micrometers, or between 100 nanometers and 10 micrometers. The formation current applied to make the anode layers may include a current between 0.001 and 150 Amperes, between 0.1 and 800 Amperes, or about 1 Amperes. The formation current may be applied for 0.01, 0.1, 0.5, 1, 2, 3, 4, 5, 6, 7, 8, 9, 10, 18, 24, or 48 hours, or more. The formation current may be applied all at once or over multiple charges.

Figure 1B:
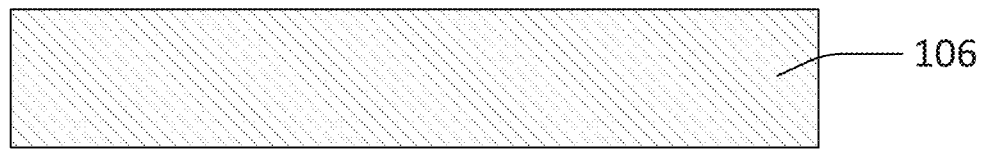
FIG. 1B is an exemplary illustration of an individual cathode active layer according to one embodiment of the present disclosure.
Figure 1C:
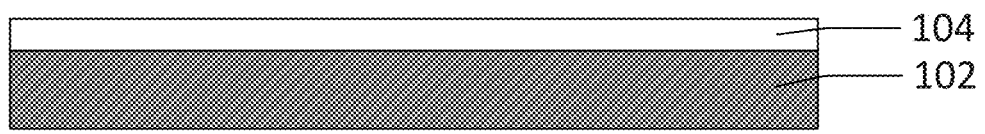
FIG. 1C is an exemplary illustration of an individual current collector clad with a solid-state electrolyte according to one embodiment of the present disclosure.

Turning more specifically to the Figures, FIG. 1A depicts an exemplary illustration of a side view of an article 100 for forming an electrochemical device according to one embodiment of the present disclosure. In this illustration, no formation current has yet been passed through the article. The section of the article 100 contains stacked repeating layers of current collectors 102 clad with solid-state electrolyte layers 104 and also cathode active material layers 106. FIG. 1B depicts a single cathode active layer 106. FIG. 1C depicts a single current collector 102 clad with a solid-state electrolyte layer 104.

Figure 2:
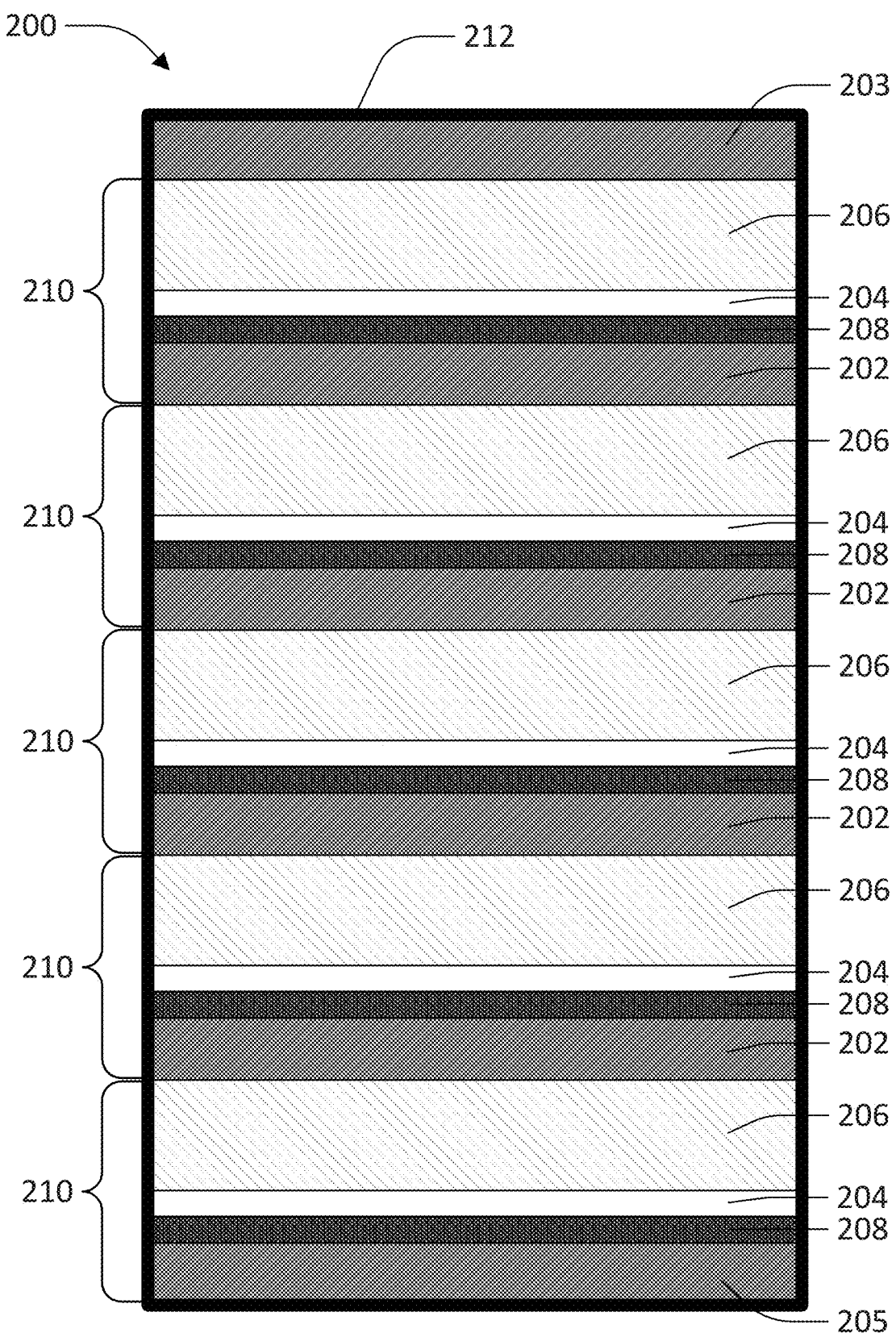
FIG. 2 is an exemplary illustration of a side view of an electrochemical device according to one embodiment of the present disclosure. The electrochemical device of the illustration has undergone a formation current.

FIG. 2 depicts an electrochemical device 200 according to one embodiment of the present disclosure. The electrochemical device of the illustration represents an article that has undergone a formation current along with additional elements. The electrochemical device contains stacked repeating layers of current collectors 202, anode layers 208, solid-state electrolyte layers 204, and cathode layers 206. Each of these four items make up an individual electrochemical cell 210 which are repeated in a bipolar configuration. Each of the electrochemical cells 210 share a current collector with both of its adjacent cells. The electrochemical device contains a positive terminal current collector 203 and a negative terminal current collector 205. The electrochemical cell also contains other additional elements such as a housing 212. In this illustration, the housing 212 has been represented by a single black box.

EXAMPLES

The following Examples are provided in order to demonstrate and further illustrate certain embodiments and aspects of the present invention and are not to be construed as limiting the scope of the invention.

Example 1

Figure 3:
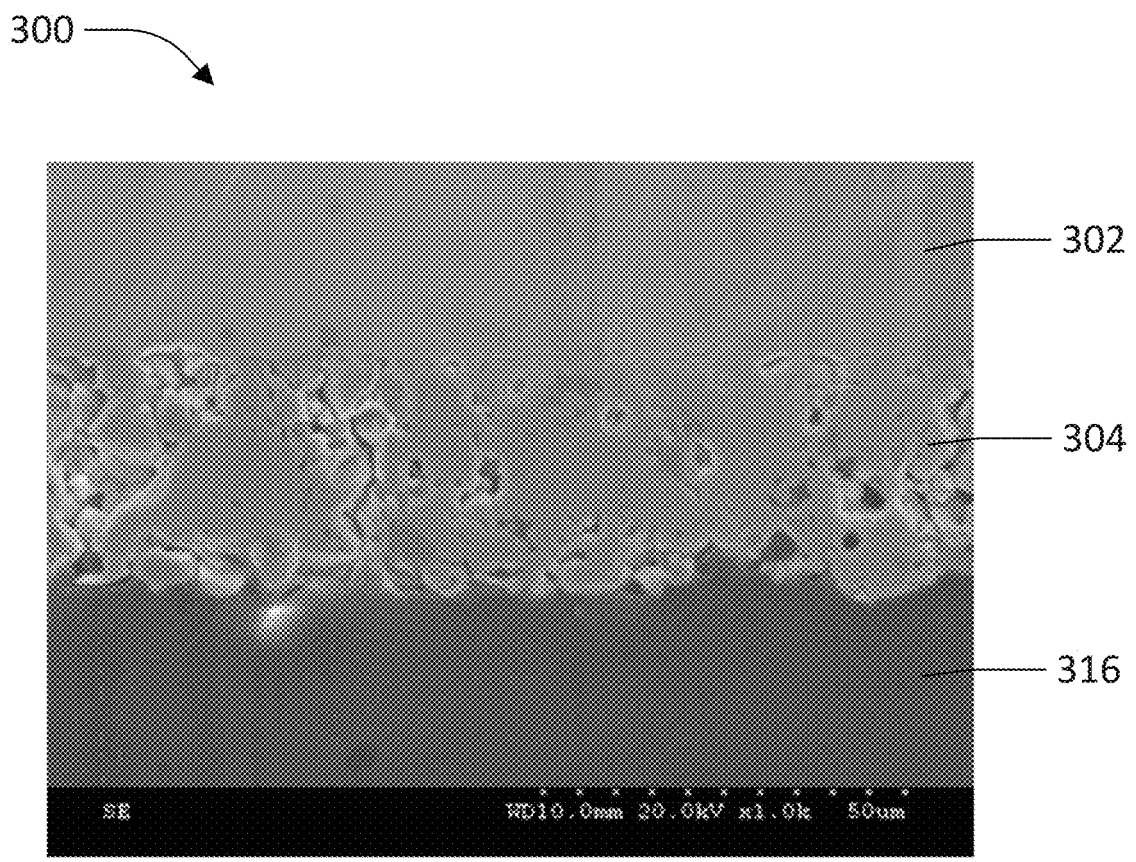
FIG. 3 is a scanning electron microscope (SEM) image of an experimental current collector clad with a solid-state electrolyte.

As shown in FIG. 3, a current collector 302 with a slurry cast and sintered solid-state electrolyte 304 was attached to an epoxy mounting 316. A cross section was then imaged using a scanning electron microscope (SEM). In this experiment, lithium lanthanum zirconium oxide was used as the solid-state electrolyte. The current collector used was nickel. The solid-state electrolyte layer exhibited Li-ion conductivities of about 0.1 mS/cm which is comparable to similar materials processed using bulk techniques.

Example 2

Figure 4:
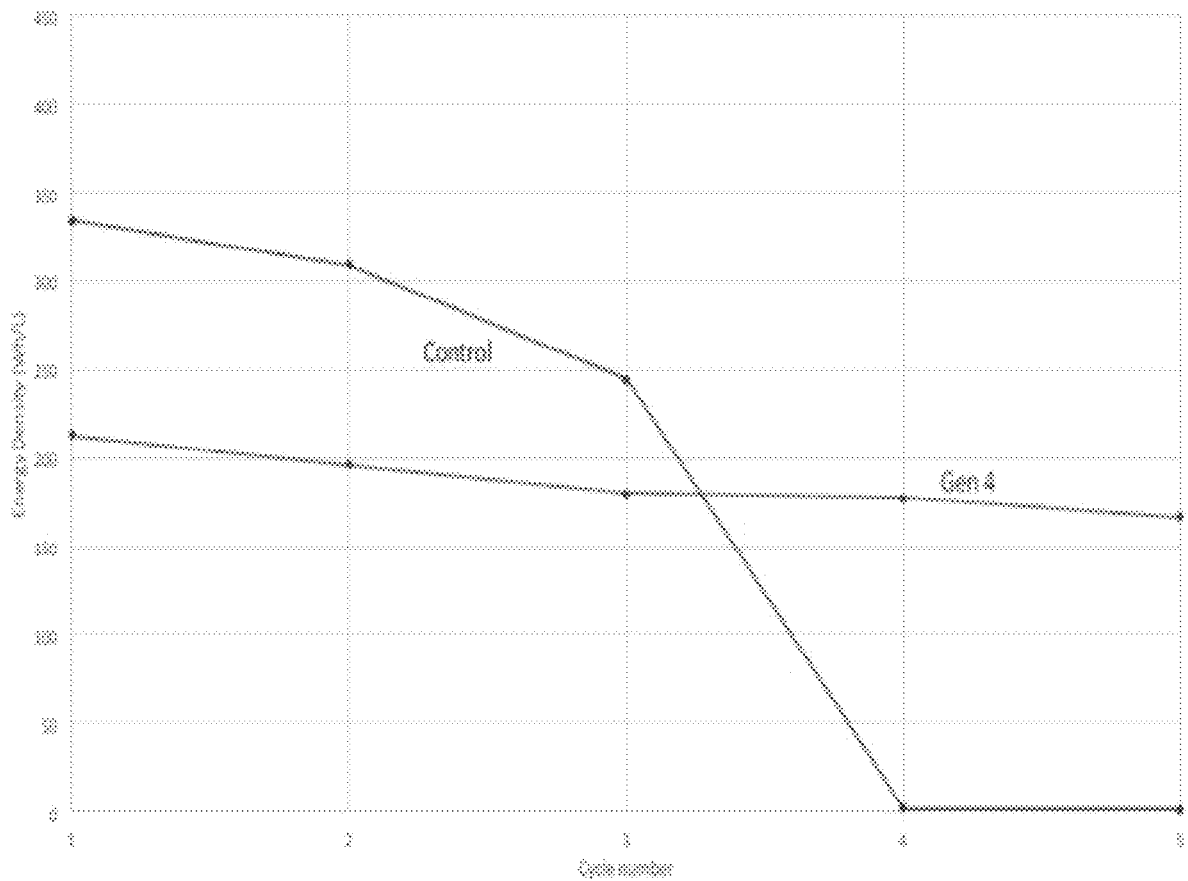
FIG. 4 is an experimental plot of the energy density versus cycle number for an electrochemical cell (Gen4) constructed according to the systems and methods of the present disclosure. Also plotted is a control cell.

As shown in FIG. 4, the discharge energy density (Wh/L) versus cycle number was plotted for an experimental electrochemical cell identified as Gen4 in FIG. 4. The experimental cell was constructed from a current collector clad with a solid electrolyte separator, which was a sintered LLZO garnet, and a conventional Li-ion composite cathode and liquid electrolyte where the composite cathode was comprised of 94 wt % 111 NMC active material, 3 wt % carbon black conductive additive, and 3 wt % polyvinylidene difluoride (PVDF) binder and the liquid electrolyte was 1M $LiPF_6$ in 3:7 ethylene carbonate:ethyl methyl carbonate (EC:EMC) with 2 wt % vinylene carbonate (VC). For comparison, a control cell was assembled in which a bare current collector was used with a traditional polyethylene polymeric Li-ion separator and the same cathode. Both cells were galvanostatically cycled at 1C charge and 1C discharge rates with cutoff voltages of 2.5 and 4.2V and no constant voltage segment. (A 1C charge rate means that the charge current will charge the entire battery to the cutoff voltage in 1 hour. A 1C discharge rate means that the discharge current will discharge the entire battery to the cutoff voltage in 1 hour.) After the fourth cycle, the control cell short circuited, indicative of the well-known lithium dendrite phenomenon. In contrast, the cell constructed form the clad current collector continued to operate.

Thus, the present invention provides an article for forming an electrochemical device such as a bipolar battery, and a method of making an electrochemical device.

Although the invention has been described in considerable detail with reference to certain embodiments, one skilled in the art will appreciate that the present invention can be used in alternative embodiments to those described, which have been presented for purposes of illustration and not of limitation. Therefore, the scope of the appended claims should not be limited to the description of the embodiments contained herein.

What is claimed is:

1. An article for forming an electrochemical device, the article comprising:
    a plurality of layered structures, each layered structure comprising:
        (i) a current collector clad with a solid-state electrolyte material, and
        (ii) a cathode active material in contact with the solid-state electrolyte material,
    wherein a current collector of one of the layered structures is in contact with cathode active material of another of the layered structures.

2. The article of claim 1, wherein each layered structure is unformed.

3. The article of claim 1, wherein the current collector comprises a single material comprising a metal or a metal alloy.

4. The article of claim 3, wherein the current collector comprises a material selected from the group consisting of nickel, molybdenum, titanium, zirconium, tantalum, alloy steel, stainless steel, nickel based super alloys, cobalt based super alloys, copper, aluminum, or mixtures thereof.

5. The article of claim 1, wherein the current collector comprises a bimetal having a first material that at least partially contacts the solid-state electrolyte material and a second material that at least partially contacts the cathode active material of another of the layered structures.

6. The article of claim 5, wherein the first material is selected from the group consisting of nickel, molybdenum, titanium, zirconium, tantalum, alloy steel, stainless steel, nickel based super alloys, cobalt based super alloys, copper, or mixtures thereof.

7. The article of claim 5, wherein the second material is selected from the group consisting of aluminum, nickel, alloy steel, stainless steel, nickel based super alloys, or mixtures thereof.

8. The article of claim 1, wherein the current collector has a thickness between 1 nanometer and 100 micrometers.

9. The article of claim 1, wherein the solid-state electrolyte material comprises a material selected from the group consisting of lithium phosphorous oxynitride (LiPON), oxide based garnets, sodium super ionic conductors (NaSICON), lithium super ionic conductors (LiSICON), thio-LiSICONs, sulfide glass, polymers, or mixtures thereof.

10. The article of claim 9, wherein the solid-state electrolyte material is selected from the group consisting of lithium lanthanum zirconium oxide (LLZO), aluminum doped LLZO, tantalum doped LLZO, lithium aluminum titanium phosphate (LATP), lithium aluminum germanium phosphate (LAGP), lithium phosphorous sulfide (LPS), poly(ethylene oxide) (PEO), polyacrylonitrile (PAN), crystalline thermoplastic polymers, or mixtures thereof.

11. The article of claim 10, wherein the solid-state electrolyte material comprises lithium lanthanum zirconium oxide (LLZO) or a derivative thereof.

12. The article of claim 1, wherein the solid-state electrolyte material has a thickness between 1 nanometer and 100 micrometers.

13. The article of claim 1, wherein the cathode active material comprises an active material selected from the group consisting of layered oxides, olivine phosphates, spinel oxides, disordered rock salt oxides, conversion cathodes, sulfur, lithium titanium sulfide, vanadium oxide, or mixtures thereof.

14. The article of claim 13, wherein the active material comprises at least one of lithium cobalt oxide (LCO), lithium nickel manganese cobalt oxide, lithium nickel oxide (LNO), lithium nickel cobalt aluminum oxide (NCA), lithium iron phosphate (LFP), lithium nickel phosphate (LNP), lithium cobalt phosphate (LCP), lithium manganese phosphate (LMP), lithium manganese oxide (LMO), lithium nickel manganese oxide (LMNO), lithium nickel zirconium oxide, lithium zirconium oxide, lithium magnesium zirconium oxide, lithium nickel tantalum oxide, lithium niobium oxide, lithium iron sulfide, lithium copper fluoride, lithium iron fluoride, or mixtures thereof.

15. The article of claim 1, wherein the cathode active material forms a composite cathode layer along with an ion conducting material.

16. The article of claim 15, wherein the ion conducting material comprises at least one of an oxide solid electrolyte, a phosphate solid electrolyte, a sulfur based solid electrolyte, a polymer based solid electrolyte, or a gel based electrolyte.

17. The article of claim 1, wherein the cathode active material has a thickness between 1 nanometer and 400 micrometers.

18. A method of making an electrochemical device, the method comprising:
(a) providing a layer of a cathode active material;
(b) providing a current collector clad with a solid-state electrolyte material;
(c) placing the layer of the cathode active material in contact with the solid-state electrolyte material to create a first layered structure;
(d) repeating steps (a) to (c) to create a second layered structure; and
(e) combining the first layered structure and the second layered structure such that a current collector of the first layered structure is in contact with cathode active material of the second layered structure.

19. The method of claim 18, wherein step (d) is repeated several times to create a plurality of layered structures to be combined using the procedure of step (e).

20. The method of claim 18, wherein the current collector comprises a material selected from the group consisting of nickel, molybdenum, titanium, zirconium, tantalum, alloy steel, stainless steel, nickel based super alloys, cobalt based super alloys, copper, aluminum, or mixtures thereof.

21. The method of claim 18, wherein the current collector comprises a bimetal having a first material that at least partially contacts the solid-state electrolyte material and a second material that at least partially contacts the cathode active material of the adjacent layered structure,
wherein the first material is selected from the group consisting of nickel, molybdenum, titanium, zirconium, tantalum, alloy steel, stainless steel, nickel based super alloys, cobalt based super alloys, copper, or mixtures thereof, and
wherein the second material is selected from the group consisting of aluminum, nickel, alloy steel, stainless steel, nickel based super alloys, or mixtures thereof.

22. The method of claim 18, wherein the current collector has a thickness between 1 nanometer and 100 micrometers.

23. The method of claim 18, wherein the solid-state electrolyte material comprises a material selected from the group consisting of lithium phosphorous oxynitride (LiPON), oxide based garnets, sodium super ionic conductors (NaSICON), lithium super ionic conductors (LiSICON), thio-LiSICONs, sulfide glass, polymers, or mixtures thereof.

24. The method of claim 18, wherein the solid-state electrolyte material is comprised of a material selected from the group consisting of lithium lanthanum zirconium oxide (LLZO), aluminum doped LLZO, tantalum doped LLZO, lithium aluminum titanium phosphate (LATP), lithium aluminum germanium phosphate (LAGP), lithium phosphorous sulfide (LPS), poly(ethylene oxide) (PEO), polyacrylonitrile (PAN), crystalline thermoplastic polymers, or mixtures thereof.

25. The method of claim 18, wherein the solid-state electrolyte material comprises lithium lanthanum zirconium oxide (LLZO) or a derivative thereof.

26. The method of claim 18, wherein the solid-state electrolyte material is clad onto the current collector using at least one of chemical vapor deposition, physical vapor deposition, atomic layer deposition, slurry casting and sintering, painting, powder coating, thermal spraying, cold spraying, aerosol deposition, flux deposition, electrodeposition, or electroless chemical deposition.

27. The method of claim 18, wherein the solid-state electrolyte material has a thickness between 1 nanometer and 100 micrometers.

28. The method of claim 18, wherein the layer of a cathode active material comprises an active material selected from the group consisting of layered oxides, olivine phosphates, spinel oxides, disordered rock salt oxides, conversion cathodes, sulfur, lithium titanium sulfide, vanadium oxide, or mixtures thereof.

29. The method of claim 28, wherein the active material comprises at least one of lithium cobalt oxide (LCO), lithium nickel manganese cobalt oxide, lithium nickel oxide (LNO), lithium nickel cobalt aluminum oxide (NCA), lithium iron phosphate (LFP), lithium nickel phosphate (LNP), lithium cobalt phosphate (LCP), lithium manganese phosphate (LMP), lithium manganese oxide (LMO), lithium nickel manganese oxide (LMNO), lithium nickel zirconium oxide, lithium zirconium oxide, lithium magnesium zirconium oxide, lithium nickel tantalum oxide, lithium niobium oxide, lithium iron sulfide, lithium copper fluoride, lithium iron fluoride, or mixtures thereof.

30. The method of claim 18, wherein the layer of the cathode active material has a thickness between 1 nanometer and 400 micrometers.

31. The method of claim 18, wherein positioning the layer of a cathode active material comprises placing the layer of a cathode active material on the solid-state electrolyte material in a manner that the layer of a cathode active material and the current collector are congruently superimposed over one another.

32. The method of claim 18, further comprising:
(f) passing a formation current through the layered structures, wherein passing the formation current generates an anode layer between each solid-state electrolyte material and its adjacent current collector.

33. The method of claim 32, wherein the anode layer comprises lithium metal.

34. The method of claim 32, wherein the anode layer has a thickness between 1 nanometer and 100 micrometers.

* * * * *